US005571851A

United States Patent [19]

Freeman et al.

[11] Patent Number: 5,571,851

[45] Date of Patent: Nov. 5, 1996

[54] REINFORCING FILLERS FOR PLASTICS SYSTEMS

[75] Inventors: Gary Freeman; Carl J. Marshall, both of Macon, Ga.

[73] Assignee: J.M. Huber Corporation, Edison, N.J.

[21] Appl. No.: 486,677

[22] Filed: Jun. 7, 1995

Related U.S. Application Data

[62] Division of Ser. No. 188,088, Jan. 28, 1994, abandoned.

[51] Int. Cl.$^6$ .................... C08K 3/20; C08K 5/54; C08L 77/00
[52] U.S. Cl. ............. 523/212; 523/213; 523/205; 524/447; 524/451; 524/494; 524/606
[58] Field of Search ................. 524/606, 447, 524/451, 494; 523/212, 213

[56] References Cited

U.S. PATENT DOCUMENTS

| | | | |
|---|---|---|---|
| 3,702,783 | 11/1972 | Hartein | 428/391 |
| 4,179,539 | 12/1979 | Schweizer | 472/90 |
| 4,235,835 | 11/1980 | Stutzman et al. | 524/445 |
| 4,280,949 | 7/1981 | Dieck | 524/445 |
| 4,357,271 | 11/1982 | Rosenquist | 524/447 |
| 4,399,246 | 8/1983 | Hyde | 524/445 |
| 4,427,452 | 1/1984 | Jeffs | 523/205 |
| 4,467,057 | 8/1984 | Dieck et al. | 524/445 |
| 4,603,158 | 7/1986 | Markham et al. | 523/212 |
| 4,609,587 | 9/1986 | Giordano et al. | 428/402 |
| 4,740,538 | 4/1988 | Sekutowski | 523/205 |
| 5,244,958 | 9/1993 | Goodman | 524/445 |
| 5,260,348 | 11/1993 | Shepherd et al. | 525/477 |

FOREIGN PATENT DOCUMENTS

| | | |
|---|---|---|
| 0028391 | 5/1981 | European Pat. Off. ........ 523/212 |
| 28391 | 10/1980 | Germany . |
| 1130326 | 6/1986 | Japan . |
| 1318051 | 12/1989 | Japan . |

OTHER PUBLICATIONS

Bepex Turbulizer Trade Bulletin (1964) Strong–Scott Mfg. Co., pp. 1–5.

Dennis Sekutowski, "Improved Impact Of Mineral/Nylon Systems Through Surface Modification", Antec '87, pp. 1264–1267.

*Primary Examiner*—Paul R. Michl
*Assistant Examiner*—Andrew E. C. Merriam
*Attorney, Agent, or Firm*—Lowe, Price, LeBlanc & Becker

[57] ABSTRACT

A silane treated calcined clay, used as a filler in plastics such as polyamide or nylon resins, has improved tensile strength and flexural strength without substantial loss of impact strength, said calcined clay having been treated with a blend of silanes comprising an aminosilane and an alkylsilane.

36 Claims, 1 Drawing Sheet

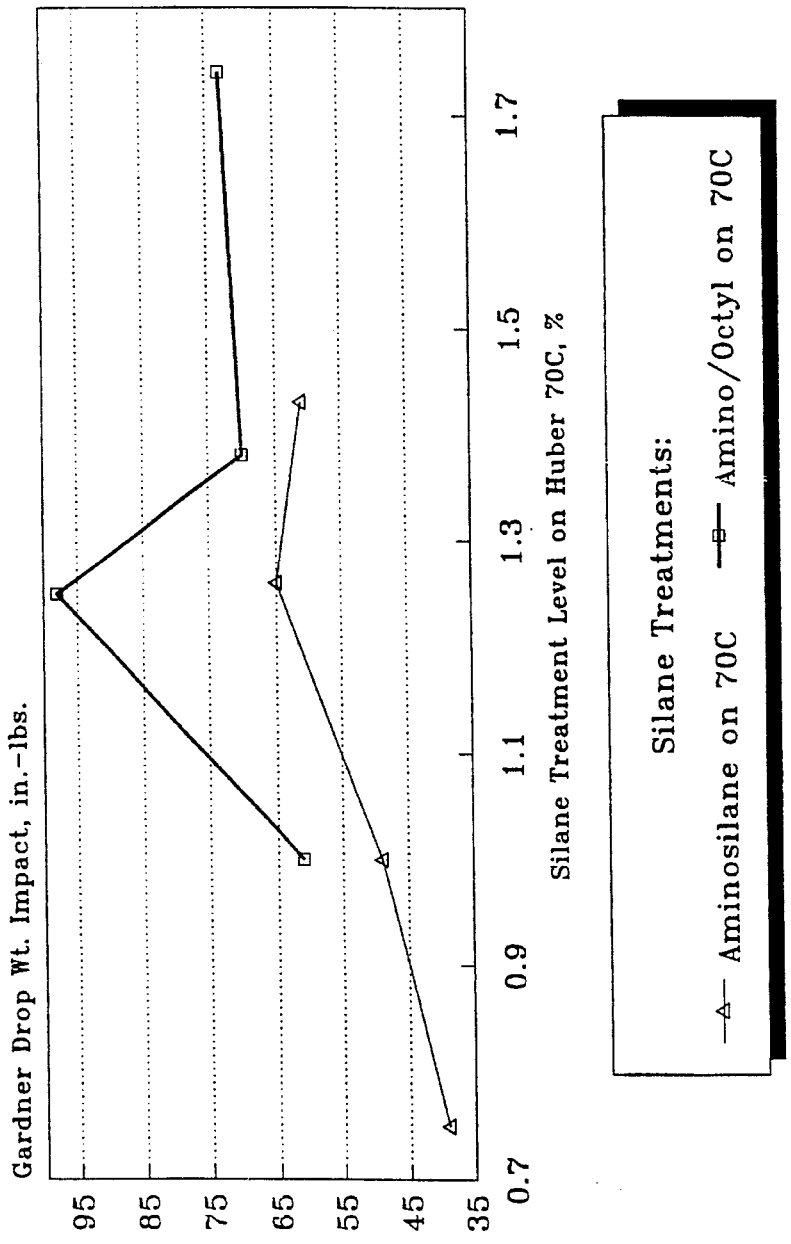
FIGURE

REINFORCING FILLERS FOR PLASTICS SYSTEMS

This application is a division of application Ser. No. 08/188,008 filed Jan. 28, 1994, now abandoned.

FIELD OF THE INVENTION

This invention relates to improved reinforcing fillers for plastics and more particularly relates to an improved reinforcing filler comprising a mineral substrate such as calcined clay which has been treated with a select blend of silanes.

BACKGROUND ART

It is known in the art that incorporating additives to plastics systems improve characteristics such as tensile strength, flexural strength, elongation or stretching, impact strength, and the like. Many thermoplastics, polyamides (nylons) in particular, are known to be moisture sensitive and will hydrolyze. Therefore, commercially anhydrous fillers are added to such resin systems.

The preparation and subsequent utilization of minerals such as treated clay products as functional fillers for many different resin applications are well known to those skilled in the art. The final end-use applications for such filler products can range from rubber and plastics compounds (both thermoplastic and thermoset types) to uses in industrial coatings, caulks, sealants and adhesives. Several examples of treated calcined clays being used in filler type applications can be found in the patent literature.

U.S. Pat. No. 5,244,958 (1993), describes the preparation of treated calcined clay products particularly useful as fillers in EPDM rubber insulation compounds. Useful calcined clay surface treatments included substituted silanes (e.g., those containing mercapto, amino, vinyl or alkyl type functionality), silazanes, polysiloxanes or select organometallic coupling agents (like organozirconates, organotitanates, etc.).

U.S. Pat. No. 4,740,538 (1988), describes a treated calcined clay useful for nylon plastics whose surface treatment is a dual component system composed of an amino functional silane coupling agent and a triethanolamine or phenol impact modifier. The treated products of this invention are prepared by applying successive chemical surface treatments, i.e. a coating of impact modifier is subsequently coated with a deposit of aminosilane coupling agent.

U.S. Pat. Nos. 4,467,057 (1984) and 4,280,949 (1981), describe the use of a silane-treated calcined clay in conjunction with a polymeric modifier additive to provide increased physical properties to articles molded from polyester compositions.

U.S. Pat. No. 4,427,452 (1984), describes the use of a silane treated, flash-calcined kaolin clay as a functional filler in various elastomeric compositions. Substituted silane coupling agents containing either amino or mercapto type functionality are employed.

U.S. Pat. No. 4,399,246 (1983), describes polyamide compositions containing a mineral filler (such as calcined clay or talc) together with low addition levels of an aminosilane and an N-substituted hydrocarbyl sulfonamide (both chemical additives being added "in situ") to provide molded plastic parts with improved impact resistance.

U.S. Pat. No. 4,357,271 (1982), describes a polycarbonate molding composition containing a calcined clay filler which was pre-treated with aminosilane coupling agent. U.S. Pat. No. 4,235,835 (1980), describes a thermoset ethylene-vinyl acetate composition containing a vinylsilane-treated calcined clay as a functional filler. U.S. Pat. No. 5,260,348 (1993), describes an improved, curable silicone-based composition containing a mineral filler, a cross-linking agent (e.g., an alkyl triacetoxysilane), some adhesion promoter (e.g., an epoxy or an amino functional silane) plus other various components. U.S. Pat. No. 4,179,537 (1979), describes a dual component treatment system for inorganic fillers that improves the adhesion of glass to unsaturated thermoset resins. The preferred surface treatment used on glass consists of a blend of methacryl functional silane and an alkylsilane. U.S. Pat. No. 3,702,783 (1972), describes the treatment of glass filler with a prescribed mixture of epoxysilane and methylsilane to improve its bonding to organic resins like polyamides.

While the treated calcined clay products described above are certainly related scientific art to the treated products of the present invention, none of them teach the use of a silane treatment mixture for minerals such as calcined clays comprising a unique blend of amino functional silane and an alkylsilane which together substantially improve the drop weight impact properties of resin systems and especially of highly filled polyamide compositions. For example, U.S. Pat. Nos. 4,399,246 and 4,740,538 both describe specific chemical additives used in combination with an aminosilane coupling agent to improve the impact properties of filled polyamide compositions. However, neither technology uses a second type of organosilane for this purpose. Furthermore, the first approach involves indirect treatment via the "in situ" addition of both chemical reagents during compounding of the nylon or polyamide composition while the latter approach requires successive clay treatment steps rather than the simultaneous silane treatment approach used in this invention.

It is also known that while the addition of silane treated calcined clays in the appropriate amounts will improve tensile strength and flexural strength of polyamides, they will also decrease the impact strength of the polyamides. Therefore, a continuing problem in the art is to provide the required improvements in other characteristics of the polyamides without adversely affecting the impact strength of the polyamide.

SUMMARY OF THE INVENTION

It is according to one object of this invention to provide an improved filler for plastics systems such as polyamides. A further object of the invention is to provide an improved plastics product having improved flexural and tensile strength without corresponding loss of impact strength.

A still further object of the invention is to provide an improved filler for resin systems comprising a mineral base such as calcined clay which has been treated with a dual silane blend and a method for the production of the treated mineral.

Other objects and advantages of the invention will become obvious as the description proceeds.

In satisfaction of the foregoing objects and advantages, there is provided by this invention an improved filler for plastics systems which comprises a mineral base such as calcined clay which has been treated on its surface by a blend of silanes, said blend of silanes comprising a mixture of an aminosilane and an alkylsilane.

The present invention also provides a method for preparation of the silane treated mineral which comprises the simultaneous treatment of the calcined clay under fluidized turbulent conditions.

Also provided by this invention are plastic products containing treated mineral fillers, said minerals having been pretreated with a dual component silane.

BRIEF DESCRIPTION OF THE DRAWINGS

Reference is now made to the drawing accompanying the application, wherein the figure is a graph illustrating Gardner DWI values compared with a silane treated clay in a filled Nylon 6,6.

DESCRIPTION OF THE INVENTION

In general, the present invention relates to novel, silane treated minerals such as calcined kaolin clay products which behave as highly functional fillers for resin systems and especially for polyamide resin systems (such as Nylon 6,6), in that the novel filler yields excellent Gardner drop weight impact values with little or no sacrifice in the resulting tensile and flexural properties. The silane treated mineral products of the present invention are produced by a silane-based surface treatment process utilizing a select combination of substituted organosilanes that are preferably applied simultaneously and substantially uniformly to the mineral as a mixture. The two silane components of choice in these treatment mixtures are amino functional silanes and alkylsilanes which must be combined in certain blend ratios to provide the desired drop weight impact improvements.

In the preparation of the treated products of this invention, it is highly preferred that calcined kaolin clays be used as the starting inorganic filler material, due to their anhydrous nature, rather than using other clay minerals such as standard water washed or air-floated type hydrous clays. This preference is largely based on the fact that the treated fillers described herein are especially targeted for use in nylon compositions, as it is well known that polyamides (nylons) tend to be rather sensitive to moisture. Although calcined kaolin clays are the clay mineral substrate of choice for silane treatment in this invention and are exemplified herein, other suitable inorganic fillers commonly used in thermoplastics (such as talc, wollastonite or glass) can also be treated and successfully used as highly reinforcing fillers.

Suitable calcined clay feedstocks, as defined herein, are those kaolin clays which have been substantially dehydroxylated and hence rendered X-ray amorphous as the result of being subjected to a very high temperature treatment process. Either "shock" or "conventional" clay calcining conditions, which are familiar to those skilled in the art, can be used to produce useful calcined clay feedstocks that should contain at least 50% by weight of its particles smaller than 2.0 microns in equivalent spherical diameter, but more preferably should contain at least 65% by weight of its particles smaller than 2.0 microns. Ideally, the calcined clay feedstocks used for silane treatment and targeted for subsequent employment in various polyamide resins, should have an average Stokes Equivalent Particle Diameter of 0.5–1.6 microns. Two such calcined clay products meeting these fine particle size requirements are manufactured by the J. M. Huber Corporation under the product tradenames Huber 70C and Huber 90C. The typical physical properties of Huber 70C and Huber 90C are compared in Table I hereinafter. Given that these two calcined clays are used herein in demonstrating many of the preferred embodiments of this invention, they will for purposes of reading simplicity be hereafter referred to as just 70C and 90C, respectively.

In preparing the treated calcined clay products of this invention, a very select combination of substituted organosilanes must be used together to produce the proper clay surface treatment needed to yield the desired Gardner drop weight impact improvements. In general terms, the two silane components of choice for these treatment mixtures are commonly known as amino functional silanes and alkylsilanes. A large number of different amino functional silanes and alkylsilanes are commercially available that can be successfully used as components of the calcined clay treatment mixture. The aminosilanes and alkylsilanes considered useful in producing the treated products of this invention can be defined from a compositional standpoint by the following chemical formulas:

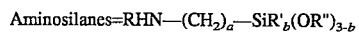

$$\text{Aminosilanes} = RHN\text{—}(CH_2)_a\text{—}SiR'_b(OR'')_{3-b}$$

wherein:

R=H or $H_2NCH_2CH_2$—
R'=$C_1$–$C_3$ alkyl group
R"=$C_1$–$C_3$ alkyl, aryl or acetyl group
a=a value of 1–6
b=a value of 0 or 1 and

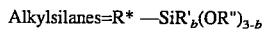

$$\text{Alkylsilanes} = R^*\text{—}SiR'_b(OR'')_{3-b}$$

wherein:

R'=$C_1$–$C_3$ alkyl group
R"=$C_1$–$C_3$ alkyl, aryl or acetyl group
R*=$C_1$–$C_{20}$ alkyl group
b=a value of 0 or 1

Among the various aminosilane coupling agents defined above, the highly preferred choices include N-2-aminoethyl-3-aminopropyltrialkoxysilane, N-(2-aminoethyl)-3-aminopropylmethyldialkoxysilane, and 3-aminopropyltrialkoxysilane, where in all cases, the hydrolyzable alkoxy substituents are most commonly either methoxy and/or ethoxy chemical groups. Among the various alkylsilane reagents, those which are preferably used for blending with an aminosilane include those having very long chain alkyl substituents containing from 8 to about 18 carbon atoms (i.e., R* =$C_8$–$C_{18}$). Two examples of highly preferred alkylsilane reagents include n-Octyltrialkoxysilane and n-Octadecyltrialkoxysilane, where in both cases, the hydrolyzable alkoxy substituents are most commonly either methoxy and/or ethoxy chemical groups. It should also be pointed out that the preferred aminosilane and alkylsilane blending components, used in preparing the treatment mixtures of this invention, can contain either similar or dissimilar alkoxy substituents relative to one another and still provide the desired impact improvements for calcined clays. In the case where different alkoxy substituents are provided by the two silanes to be blended, it is well known to those skilled in the art that such silane mixtures will result in trans-esterification reactions. However, such side reactions between the individual silane molecules have not been observed to have any deleterious effects on silane product stability or on their eventual usefulness in producing treated fillers with good functional performance.

One of the highly preferred embodiments of this invention is that the aminosilane and alkylsilane components do not have to be added separately in treating the calcined clay but can be pre-blended in the appropriate proportions to yield a treatment mixture. In addition, this aminosilane/alkylsilane treatment blend does not have to be used immediately but possesses excellent shelf-life (in the absence of moisture introduction). Good shelf-life properties for this silane blend are advantageous from a production logistics point of view, particularly when carrying out a continuous treatment process conducted over extended periods of time.

In terms of maximizing the drop weight impact performance of treated calcined clay products targeted for use in nylon applications, the amino functional silane and alkylsilane reagents defined above need to be combined into treatment mixtures within a very specific range of silane weight ratios. The treatment mixtures of greatest utility have aminosilane/alkylsilane ratios ranging from about 1:1 up to 5:1 by weight, preferably about 3:1 to 5:1. In many instances, optimum filler reinforcement properties are obtained in polyamides (nylon) when using about a 3:1 weight ratio blend of aminosilane/alkylsilane for surface treatment. This 3:1 ratio silane blend thereby represents the most preferred treatment practice for our calcined clays. It is interesting to note that the impact performance benefits seen in nylon, through the blending in of small amounts of an alkylsilane with a conventional aminosilane treatment, are very unexpected in view of the individual performance characteristics of alkylsilanes and of aminosilanes, respectively. For example, it was discovered that octylsilane treated 70C or stearylsilane treated 70C products provide drop weight impact properties that are surprisingly no better than those obtained from an untreated 70C. Therefore one must conclude that select combinations of these two organosilanes, as dual surface treatments on calcined clay, provide truly synergistic reinforcement properties.

In addition to the effects derived from the aminosilane/alkylsilane blend ratio, it was also noted that the total silane treatment level on the calcined clays does have a profound influence on final reinforcement properties. At the preferred aminosilane/alkylsilane weight ratios of 1:1 to 5:1, the silane treatment levels generally useful in producing treated products in accordance with this invention range from 0.5% to 2.0% (percent total silane as based on weight of dry clay). However, silane treatment levels of about 1.1% to 1.6% are highly preferred particularly when utilizing a treatment blend having a 3:1 weight ratio of aminosilane/alkylsilane.

It should be noted that the optimum silane treatment level for a given calcined clay filler is highly dependent upon its particle size and BET surface area properties. For calcined clays similar to Huber 70C (i.e., those with an average Stokes Equivalent Particle Diameter of about 1.4 microns), the optimum treatment level of the 3:1 silane blend is about 1.25%. In contrast, finer particle size calcined clays like Huber 90C (having an average Stokes Equivalent Particle Diameter of about 0.7 microns) require a somewhat higher treatment level of 3:1 silane blend (about 1.50%) in order to yield their optimum filler performance in nylon compositions.

As previously discussed, the treated calcined clay products of this invention function as highly reinforcing fillers in various polyamide resin systems. Polyamide resins for which these treated fillers are particularly well suited include all the common nylon thermoplastic grades, such as Nylon 6, Nylon 6,12 and Nylon 6,6. In these nylon applications, the treated fillers will yield excellent drop weight impact properties with little or no accompanying sacrifices in the tensile and flexural properties. In nylon, useful loadings of treated filler range from about 5% to 50% by weight, while those in the 20% to 40% range are particularly advantageous with respect to the combination of final compound properties provided.

It should also be noted that the treated products described herein can behave as functional fillers in plastics systems other than nylon compositions due to the availability of some pendant amino functionality. Other end-use application examples for the fillers of the invention include unsaturated polyester thermoset resins and RIM polyurea/polyurethane compounds. In particular, the use of the treated calcined clays as fillers in polyester thermoset compositions designed for microwaveable dinnerware applications has found utility due to the high degree of food staining resistance imparted to the molded parts. In these dinnerware applications, it is believed that the hydrophobic characteristics imparted by the alkylsilane component of the 3:1 ratio treatment blend is largely responsible for improving the food staining resistance of such plastics under microwave use conditions.

Another aspect of the present invention is a commercially viable, continuous silane treatment process for producing the treated calcined clay products described herein. The treated products of this invention can be readily made on a laboratory scale using batch treatment type processes that employ high speed, dry mixing equipment (such as a Littleford mixer or similar facsimile). These batch treatment processes work best when adding the silane treatment agents as a dilute alcohol solution (the silane concentration being typically 10–50% by weight) so as to aid surface treatment uniformity. However, treated 70C or 90C products made in this batchwise manner are not commercially practical processes for the kaolin industry as they often require a subsequent drying step to remove the residual alcohol.

The treated calcined clay products of this invention are preferably made via a continuous silane treatment process utilizing an in-line, intimate solids/liquid mixing device (such as a Bepex Turbulizer unit or similar facsimile).

A suitable apparatus for conducting the continuous process of the invention is described in U.S. Pat. No. 5,271,163, the disclosure of which is incorporated herein by reference. As shown in U.S. Pat. No. 5,271,163 a fluidizable cylindrical apparatus is provided within a housing with agitation provided within the housing by a plurality of paddles. The silane blend is sprayed into a highly fluidized chamber wherein the calcined clay solids are contained under agitation. The clay is added through a solids feeder and the silane mixture, which has been preblended, is added through a ratio controller by spraying with an injection pump. This treatment with the silane causes some liberation of alcohol which can be vented away under vacuum. In a preferred procedure, the alcohols are driven off by steam heating. The system may be provided with a steam jacket. The resulting product is a calcined clay in which the silanes are generally uniformly coated on the surface of the clay.

In such continuous treatment processes, dilute alcohol solutions of silanes can still be utilized if absolutely necessary; however, it is greatly preferred to develop continuous processing conditions that allow the silanes to be added neat while maintaining good surface treatment uniformity. A continuous treatment process affording the ability to inject neat silanes thereby provides considerable advantages to a production facility in terms of reducing cost, simplifying logistics (through the elimination of an added drying step) and yielding improved manufacturing safety (by greatly reducing the potential flash hazards associated with high levels of alcohol).

The aforementioned Bepex Turbulizer unit, when operated under the proper processing conditions, has been shown to produce treated 70C or 90C products using neat silane in a continuous manner with good surface treatment uniformity. This has been accomplished by operating the Turbulizer's mixing paddles at very high tip speeds (5000–6000 fpm) and by utilizing clay throughput rates of approximately 50–67% of the unit's rated capacity in order to well fluidize the dry calcined clay feed, while simultaneously metering in the liquid silane blend via spray nozzle injection. In addition, by operating the Turbulizer unit at temperatures of 60°–100° C. via use of its external steam jacket, it has been possible to eliminate the need for a subsequent drying step to remove the liberated alcohols from the treated calcined clay product.

Finally, it should be pointed out that considerable technical effort has been previously expended in seeking to improve the impact properties of highly filled polyamide compositions. For example, U.S. Pat. Nos. 4,399,246 and 4,740,538 each describe the use of a specific chemical additive in combination with an aminosilane coupling agent to improve impact properties. However, neither of these technologies uses a second type of organosilane reagent for this purpose. The teachings of the present invention are therefore substantially different from those of the prior art.

U.S. Pat. No. 4,399,246 teaches a process wherein mineral treatment is accomplished indirectly via "in situ" addition of an aminosilane coupling agent and a sulfonamide additive to the nylon compound. It is generally well recognized in the technical literature, that pre-treated mineral fillers offer performance advantages over filled composites which have had the same coupling agents added at equivalent levels "in situ" during the resin compounding stage. Pre-treated mineral fillers, like those described herein, also offer the plastics compounder a significant convenience factor over utilizing "in situ" type processes by completely eliminating the difficult storage, handling and addition requirements of liquid silane reagents.

U.S. Pat. No. 4,740,538 describes the use of a treated calcined clay product consisting of a dual treatment system that requires its surface treatment components to be applied in successive coating steps. In contrast, the treated products of this invention are readily produced in a one step, continuous treatment process involving the controlled addition of a pre-blended combination of silanes.

It should be noted that the Turbulizer treatment process can also be successfully carried out through the simultaneous addition of two separate silane injection streams. However, given the excellent compatibility of the two organosilane components (one being an aminosilane and the other an alkylsilane) it is considerably easier from a production logistics viewpoint to have a single metering pump system for blended silane injection rather than two separate pump systems that must then both be ratio controlled relative to the existing calcined clay feed rate.

The silane treated, calcined clay products of the present invention are highly useful as functional fillers for polyamide resin systems (such as Nylon 6,6) in that excellent Gardner drop weight impact values are provided with little or no sacrifices in the accompanying tensile and flexural properties. The fillers are applied to the nylon in a conventional manner.

The present invention is further illustrated by the following treatment process and end-use application examples, which should be regarded as demonstrating only some of the preferred embodiments and not limiting thereof its scope or any equivalency. Unless otherwise indicated all calcined clay filler loadings and chemical treatment levels are based upon weight percentages. It should also be noted that all plastics physical testing programs herein presented on nylon compositions were conducted in accordance with recognized ASTM procedures. Table II lists the various physical properties that were typically measured in the nylon test programs along with the appropriate ASTM reference numbers.

The preferred silane treated calcined clay filler product of this invention is white in color, has a specific gravity of 2.63, a surface of 7–9 BET $m^2/g$, an index of refraction of 1.54, a brightness, % reflectance of 90–93, an average Stokes Equivalent Particle Diameter of 1.4 microns and a pH of 8–10.

EXAMPLE 1

This silane treatment experiment demonstrates the unexpected functionality of various aminosilane/alkylsilane treatment mixtures on Huber 70C calcined clay for subsequent use in filled Nylon 6,6 applications. In particular, the performance benefits of long chain, aliphatic alkylsilanes (e.g., those having $C_8$–$C_{18}$ alkyl groups), when used in combination with an amino functional silane in the proper weight proportions, are shown to significantly improve resulting drop weight impact values without large accompanying losses in tensile and flexural properties.

The aliphatic alkylsilanes examined in this experiment include n-Octyltriethoxysilane and Stearylsilane (i.e., n-Octadecyltrimethoxysilane). These two alkylsilanes were thereby utilized in various blend combinations with 3-Aminopropyltriethoxysilane at a total silane addition level of 1.00% (silane percentage as based on weight of dry clay). Hence, aminosilane/alkylsilane blend ratios of 3:1, 1:1 and 1:3 by weight were then applied to Huber 70C as respectively derived from using octylsilane (test compounds D, E and F of Table III) and from using stearylsilane (test compounds H, I and J of Table III). Comparative test controls were also included in this nylon program (test compounds B, C, G and K of Table III) consisting of an untreated 70C, aminosilane treated 70C, octylsilane treated 70C and stearylsilane treated 70C, respectively. Test compound A of Table III shows the baseline physical properties of the unfilled Nylon 6,6 resin, which was Dupont's Zytel 101.

The treated calcined clay products of Example 1 were all prepared batchwise on a laboratory scale using a Littleford W-10 mixer. In each case, 1200 grams of dry Huber 70C was added to the Littleford mixer whose external jacket had been preheated to 70° C. using hot water circulated from a Neslab RTE-210 temperature controller unit. The appropriate weight (12.00 grams) of each silane or silane blend, in neat form, was added slowly to the dry calcined clay being well mixed at medium speed. Upon complete silane addition, the contents were vigorously mixed at 1800 rpm for 20 minutes at 70° C. The Littleford mixer was appropriately vented during the mix cycle to allow for the escape of all alcohol vapors eliminated from the reacted silanes. The treated 70C products were then removed and allowed to cool to room temperature. The silane treatment level of each product was verified analytically, using a Leco carbon combustion unit, prior to their compounding use in Nylon 6,6 resin.

Test batches of Nylon 6,6 resin and 70C based filler (from above) were blended together at 40% filler loadings and subsequently compounded on a ZSK 30mm twin screw extruder. Test specimens were then molded and pertinent physical properties measured as summarized in Table III.

TABLE I

| TYPICAL PHYSICAL PROPERTIES FOR CALCINED CLAYS | | |
|---|---|---|
| PHYSICAL PROPERTY | HUBER 70C | HUBER 90C |
| Pigment Specific Gravity | 2.63 | 2.63 |
| B.E.T. Surface Area, $m^2/gm$ | 7–9 | 13–17 |
| Moisture, % Maximum As Produced | 0.5 | 0.5 |
| +325 Mesh Screen Residue, % Max. | 0.02 | 0.01 |
| Average Stokes Equivalent Particle Diameter, microns | 1.4 | 0.7 |
| Oil Absorption, gm/100 gm clay (ASTM D-281) | 46–56 | 75–85 |
| Brightness, % | 90–93 | 92–94 |
| pH (@ 28% solids) | 5.0–6.0 | 5.0–6.0 |
| Index of Refraction | 1.54 | 1.54 |

TABLE II

TESTING PROCEDURES USED IN NYLON PLASTIC PROGRAMS

| Test Property | ASTM No. |
| --- | --- |
| Tensile*Modulus, psi | D-638 |
| Tensile*Strength, psi | D-638 |
| Flexural**Modulus, psi | D-790M-86 |
| Flexural**Strength, psi | D-790M-86 |
| Elongation at Break, % | D-638 |
| Notched Izod Impact, ft.-lbs. | D-256 |
| Gardner Drop Wight Impact, in.-lbs. | D-3029 |
| Heat Deflection Temp. (@ 264 psi), °C. | D-648-82 |

NOTE:
*Tensile Cross-Head Speed = 0.2 in./min.
**Flex Cross-Head Speed = 0.1 in./min.

at break relative to straight aminosilane treatment. The above performance advantages are seen in Nylon 6,6 compounds independent of whether octylsilane or stearylsilane was employed as the alkylsilane component in the 70C treatment blends. However, it should be noted that somewhat superior drop weight impact results were provided with stearylsilane, but were gained at the expense of some tensile and flexural properties relative to that obtained with octylsilane.

3.) When one compares the performance properties of the various treated 70C products, a synergistic benefit is seen in utilizing select treatment mixtures of aminosilane and alkylsilane not readily predicted on the basis of their individual silane performance attributes. For example, compare the superior performance of test compounds D and H (both containing a 3:1 treated 70C) to those of compounds C, G and K. In particular it is interesting that the alkylsilane

TABLE III

COMPARISON OF OCTYLSILANE vs. STEARYLSILANE TREATMENT SYSTEMS ON HUBER 70C IN NYLON 6,6* APPLICATION

| Property | Test Compounds | | | | | | | | | | |
| --- | --- | --- | --- | --- | --- | --- | --- | --- | --- | --- | --- |
| | A | B | C | D | E | F | G | H | I | J | K |
| Filler Loading, % | 0.0 | 40 | 40 | 40 | 40 | 40 | 40 | 40 | 40 | 40 | 40 |
| Calc. Clay Filler** | none | 70C | 70C | 70C | 70C | 70C | 70C | 70C | 70C | 70C | 70C |
| Clay Surface Treatments:*** | | | | | | | | | | | |
| % Aminosilane | none | none | 1.00% | 0.75% | 0.50% | 0.25% | — | 0.75% | 0.50% | 0.25% | — |
| % Octylsilane | — | — | — | 0.25% | 0.50% | 0.75% | 1.00% | — | — | — | — |
| % Stearylsilane | — | — | — | — | — | — | — | 0.25% | 0.50% | 0.75% | 1.00% |
| Tensile Modulus, psi (×10$^3$) | 349.5 | 653.9 | 713.5 | 710.4 | 730.1 | 720.0 | 668.7 | 644.4 | 646.9 | 658.7 | 698.0 |
| Tensile Strength, psi (×10$^3$) | 11.3 | 10.2 | 13.4 | 13.7 | 13.5 | 13.6 | 10.9 | 13.4 | 13.2 | 12.6 | 11.1 |
| Flexural Modulus, psi (×10$^3$) | 426.9 | 839.0 | 782.3 | 845.7 | 850.4 | 810.8 | 811.3 | 816.1 | 807.2 | 790.4 | 790.3 |
| Flexural Strength, psi (×10$^3$) | 16.8 | 16.9 | 23.4 | 22.2 | 21.9 | 21.2 | 17.3 | 21.9 | 21.7 | 23.7 | 26.5 |
| Elongation at Break, % | 34.5 | 2.3 | 4.8 | 5.4 | 4.7 | 4.7 | 2.7 | 6.4 | 5.0 | 3.8 | 3.4 |
| Notched Izod Impact, ft.-lbs. | 0.79 | 0.40 | 0.71 | 0.73 | 0.69 | 0.53 | 0.41 | 0.76 | 0.69 | 0.52 | 0.49 |
| Gardner Drop Weight Impact, in.-lbs. | >160 | 10 | 37 | 46 | 42 | 18 | 8 | 48 | 57 | 25 | 11 |
| Heat Deflection Temp. (@ 264 psi), °C. | 70.1 | 103.6 | 104.5 | 104.6 | 104.6 | 104.3 | 102.0 | 104.7 | 106.9 | 97.7 | 96.9 |

NOTE:
*Nylon 6,6 resin used was Dupont's Zytel 101.
**70C = "Huber 70C" fine particle size, calcined kaolin clay (Average Stokes Equivalent Particle Diameter = 1.4 microns).
***For treated clay versions, total silane addition level = 1.00% (as based on weight of dry clay). Aminosilane = 3-Aminopropyltriethoxysilane; Octylsilane = n-Octyltriethoxysilane; Stearylsilane = n-Octadecyltrimethoxysilane.

The test data of Table III reveal several interesting points as summarized below:

1.) The treated 70C products prepared from aminosilane/alkylsilane blends (Tests D, E, F, H, I and J) all yielded significant performance improvements in elongation at break, Izod impact and Gardner drop weight impact relative to the untreated 70C control (Test B). These performance enhancements were all achieved with minimum sacrifices in tensile and flexural properties.

2.) Relative to a conventional aminosilane treated 70C (Test C of Table III), improved Gardner drop weight impact values were provided by the treated products derived from the aminosilane/alkylsilane treatment blends of 3:1 or 1:1 weight ratio (Tests D, E, H and I). The 3:1 treated 70C products also showed performance advantages in elongation treatments when used alone on 70C actually yield drop weight impact values no better than that obtained with an untreated 70C. The excellent functionality of the 3:1 ratio aminosilane/alkylsilane treated 70C products described herein is therefore truly unexpected.

EXAMPLE 2

In Example 1, improved Gardner drop weight impact properties were shown to be provided by treated 70C products whose silane surface treatment consisted of an aminosilane/alkylsilane mixture having a blended weight ratio of at least 1:1 or higher. In this example, several aminosilane/octylsilane blend ratios greater than 1:1 are examined as surface treatments for 70C. In addition, total silane addition levels of 1.00% as well as 1.25% (as based on weight of dry clay) are respectively utilized at each aminosilane/octylsilane blend ratio. This matrix of treatment experiments thereby allows us to determine the performance effects of silane blend ratio as a function of total treatment level on 70C.

2.) Although the 3:1 ratio aminosilane/octylsilane treatment blend on 70C significantly improved nylon impact properties as well as elongation at break relative to using an untreated 70C, little to no accompanying losses in tensile and flexural properties were obtained.

TABLE IV

COMPARISON OF VARIOUS AMINOSILANE/OCTYLSILANE TREATMENT BLENDS ON HUBER 70C IN NYLON 6,6* APPLICATION

| Property | Test Compounds | | | | | | |
|---|---|---|---|---|---|---|---|
| | L | M | N | O | P | Q | R |
| 70C Loading**, % | 36 | 36 | 36 | 36 | 36 | 36 | 36 |
| Clay Surface Treatments:*** | | | | | | | |
| % Aminosilane | none | 0.80% | 0.75% | 0.67% | 1.00% | 0.94% | 0.83% |
| % Octylsilane | — | 0.20% | 0.25% | 0.33% | 0.25% | 0.31% | 0.42% |
| Tensile Modulus, psi (×10$^3$) | 769.2 | 743.5 | 810.1 | 724.2 | 737.7 | 762.6 | 817.7 |
| Tensile Strength, psi (×10$^3$) | 11.7 | 12.5 | 13.0 | 12.9 | 12.7 | 13.3 | 13.1 |
| Flexural Modulus, psi (×10$^3$) | 804.2 | 741.4 | 783.7 | 795.0 | 742.3 | 785.0 | 840.7 |
| Flexural Strength, psi (×10$^3$) | 20.3 | 20.3 | 21.0 | 21.4 | 20.7 | 21.4 | 22.2 |
| Elongation at Break, % | 2.6 | 6.9 | 7.7 | 5.8 | 5.1 | 8.0 | 5.0 |
| Notched Izod Impact, ft.-lbs. | 0.53 | 0.80 | 0.83 | 0.79 | 0.90 | 0.97 | 0.92 |
| Gardner Drop Weight Impact, in.-lbs. | 12 | 39 | 56 | 40 | 44 | 55 | 40 |

NOTE:
*Nylon 6,6 resin used was Dupont's Zytel 101.
**70C = "Huber 70C" fine particle size, calcined kaolin clay (Average Stokes Equivalent Particle Diameter = 1.4 microns).
***For treated clay versions, total silane addition level = 1.00% (for test systems M, N & O) and 1.25% (for test systems P, Q & R). Silane addition levels are based on weight of dry clay. Aminosilane = 3-Aminopropyltriethoxysilane; Octylsilane = n-Octyltriethoxysilane.

In this treatment study, n-Octyltriethoxysilane was the alkylsilane reagent of choice to be blended with 3-Aminopropyltriethoxysilane. The aminosilane and octylsilane were blended together at active weight ratios of 4:1, 3:1 and 2:1 respectively. These various silane blends were then applied neat to 70C at the appropriate treatment level using the Littleford W-10 mixer under exactly the same processing conditions as previously described in Example 1. The target treatment levels of 1.00% or 1.25% were verified by Leco carbon combustion analysis. The resulting 70C based test products are identified in Table IV as test compounds M, N, O, P, Q and R. An untreated 70C was also included in the nylon test program to serve as a comparative control (compound L of Table IV).

Test batches of Nylon 6,6 resin and treated 70C filler were thoroughly blended together at 36% filler loadings and subsequently compounded on the ZSK 30mm twin screw extruder. Dupont's Zytel 101 was used as the Nylon 6,6 resin. Molded specimens were then prepared and fully tested. The resulting test data are summarized in Table IV, from which several interesting conclusions can be drawn as discussed below:

1.) In terms of maximizing impact properties (both Izod and Gardner drop weight) as well as elongation at break, it is very clear that 70C should be surfaced treated with a 3:1 weight ratio blend of aminosilane/octylsilane. In comparison, the 2:1 and 4:1 treatment blends always yielded lower physical properties on 70C. Furthermore, increasing the silane treatment level of 3:1 ratio blend up to 1.25% had some further positive influence on Izod impact (e.g., compare the Izod impacts of test compounds N and Q). In terms of its overall performance properties, test product Q thereby represents the most preferred embodiment of this example. Test product Q employs a 3:1 ratio aminosilane/octylsilane treatment blend at a total treatment level of 1.25%.

EXAMPLE 3

In Example 2, a 3:1 ratio aminosilane/octylsilane treatment blend was shown to be optimum on 70C calcined clay at a total treatment level of 1.25%. The test results in Nylon 6,6 were all based on treated 70C products prepared by applying a surface coating of neat silane blend using the Littleford W-10 mixer. In this example, additional silane treatment experiments are conducted on 70C to demonstrate the dramatic effect that different clay processing conditions have on final filler reinforcement properties.

In this treatment process study, a 3:1 ratio aminosilane/octylsilane treatment blend was again the clay surface treatment of choice to be applied at a target treatment level of 1.25%. Test systems V, W and X of Table V thereby represent such treated 70C products, but each was prepared by completely different processing means. The processing method used for each is fully described below:

PROCESS 1

Test product V was produced by a laboratory scale, batch treatment process using a Hobart dough mixer for providing relatively low speed, room temperature mixing conditions. In the Hobart treatment method, 1000 grams of dry 70C clay was added to the stainless steel mixing bowl and low speed mixing was started. Some 3:1 ratio aminosilane/octylsilane blend was then diluted with methanol to a 10% total silane concentration for subsequent addition to the calcined clay. Based on a 1.25% active treatment level of blended silanes, 125.0 grams of 10% silane solution was added very slowly to the 70C with continuous product mixing. The purpose of adding the 3:1 ratio silane blend as a dilute alcohol solution rather than neat was to increase the likelihood of providing a well distributed, uniform surface treatment on the calcined clay filler. Once all the 10% silane solution had been added, low speed product mixing at room temperature was continued for an additional 30 minutes. The treated 70C clay was then transferred to a metal pan and dried at 110° C. for three hours in a forced air oven to complete silane reaction and remove residual alcohol. The targeted treatment level was verified by Leco carbon combustion analysis.

PROCESS 2

Test product W of Table V was produced on a laboratory scale using a slightly modified procedure of the previously described Littleford treatment method. In contrast to the Littleford treatment runs of Examples 1 and 2, the 3:1 ratio aminosilane/octylsilane blend was diluted with methanol to a 25% total silane concentration for subsequent addition to the calcined clay. A silane solution was employed here to potentially increase surface treatment uniformity relative to that achieved with neat silane addition. Based on a 1.25% active treatment level of 3:1 ratio silanes, 60.0 grams of 25% silane solution were added slowly to 1200 grams of dry 70C which was being continuously mixed at medium speed and mixing action provided by the Turbulizer unit. At a 70C feed rate of 800 lbs/hr, the 3:1 ratio silane blend was thereby injected at a rate of 85 ml/min to achieve the target treatment level of 1.25%. Product treatment level was again verified by Leco carbon combustion analysis. It should also be pointed out that test product U (which has a 1.25% treatment level of straight aminosilane) was produced by the same Turbulizer treatment process under identical conditions and thereby serves as a comparative test control.

The 70C based test products of Table V were thoroughly blended with Nylon 6,6 resin (Dupont's Zytel 101) at 40% filler loadings and subsequently compounded on the ZSK 30mm twin screw extruder. Molded specimens were then prepared and fully tested. The resulting test data are summarized in Table V.

TABLE V

COMPARISON OF TREATMENT PROCESSES FOR AMINOSILANE AND AMINOSILANE/OCTYLSILANE TREATMENT SYSTEMS IN NYLON 6,6* APPLICATION

| | Test Compounds | | | | | |
|---|---|---|---|---|---|---|
| Property | S | T | U | V | W | X |
| 70C Loading, % | 0.0 | 40 | 40 | 40 | 40 | 40 |
| Clay Surface Treatments:** | | | | | | |
| % Aminosilane | none | none | 1.25% | 0.94% | 0.94% | 0.94% |
| % Octylsilane | — | — | — | 0.31% | 0.31% | 0.31% |
| Tensile Modulus, psi (×10$^3$) | 424.9 | 831.5 | 834.8 | 819.8 | 858.6 | 856.4 |
| Tensile Strength, psi (×10$^3$) | 10.8 | 12.2 | 13.6 | 13.0 | 13.6 | 13.5 |
| Flexural Modulus, psi (×10$^3$) | 383.2 | 805.2 | 847.5 | 812.9 | 831.6 | 851.9 |
| Flexural Strength, psi (×10$^3$) | 14.6 | 19.5 | 22.3 | 20.7 | 21.8 | 22.1 |
| Elongation at Break, % | 53.5 | 2.3 | 7.5 | 5.8 | 9.1 | 7.9 |
| Notched Izod Impact, ft.-lbs. | 0.60 | 0.51 | 0.70 | 0.72 | 0.70 | 0.68 |
| Gardner Drop Weight Impact, in.-lbs. | >160 | 11 | 65 | 23 | 101 | 98 |

NOTE:
*Nylon 6,6 resin used was Dupont's Zytel 101.
**Silane addition levels are based on weight of dry clay. Aminosilane = 3-Aminopropyltriethoxysilane; Octylsilane = n-Octyltriethoxysilane. Treated Huber 70C calcined clays were prepared as follows:
a) U and X-Continuous treatment process via 8 inch Bepex Turbulizer.
b) V-Batch treatment process via laboratory Hobart mixer.
c) W-Batch treatment process via laboratory W-10 Littleford mixer.

had been preheated to 50° C. The contents were then vigorously mixed for an additional 20 minutes at 1800 rpm while maintaining the 50° C. temperature. The treated 70C product was removed, allowed to cool to room temperature and then analyzed by Leco carbon to verify its targeted treatment level.

PROCESS 3

Test product X was produced on a commercial scale via a continuous treatment process employing an 8 inch Bepex Turbulizer unit. Using an Accurate volumetric feeder system, dry 70C was continuously fed into the Turbulizer unit at a constant rate of 800 lbs/hr. The 8 inch Turbulizer was equipped with an external steam jacket that was heated to 80° C. with hot, pressurized water during the treatment run. The Turbulizer was also vented, under slight vacuum, to separate the liberated alcohol vapors from the treated 70C product. The Turbulizer's mixing paddles were operated at a high tip speed of 5330 fpm so as to completely fluidize the dry calcined clay feed. Under these highly fluidized conditions, liquid silane blend was continuously injected in at the appropriate rate using a metering pump to yield the target 70C treatment level of 1.25%. The 3:1 ratio aminosilane/ octylsilane blend was in this case used neat (rather than as a dilute methanol solution) due to the intense solids/liquid The principal conclusions drawn from these 70C treatment experiments are summarized below:

1.) In comparing the performance of test-products V, W and X it is clear that the low speed mixing conditions associated with the Hobart mixer yield an inferior treated 70C product as compared to the continuous method. In particular, the Gardner drop weight impact provided by test product V was roughly 25% of that provided by W or X despite its use of large diluent quantities of methanol for aiding uniform silane treatment. The obvious conclusion is that intense solids/liquid mixing action yields greater silane surface treatment uniformity on 70C calcined clay which especially manifests itself in improved Gardner drop weight impact properties.

2.) It is interesting to compare the physical properties of test compound W (Table V) with those of compound Q (from Table IV of Example 2). Both compounds utilize a treated 70C clay product having a 1.25% treatment level of 3:1 ratio aminosilane/octylsilane blend. The method of silane treatment via the Littleford mixer was somewhat different (W used a 25% silane treatment solution versus neat silane addition in producing Q). Although direct head to head comparisons between these two test programs cannot be made due to the difference in compound filler loadings (40% versus 36%) and in the two lots of Zytel 101 resin, it is still quite evident that a significant improvement in Gardner drop weight impact was provided by utilizing a silane treatment solution in the Littleford mixing process. Gardner drop weight impact increased from 55 inch-lbs (for Q) up to 101 inch-lbs (for W) despite the higher filler loading used in the latter test compound.

3.) A comparison of test compounds W and X indicates virtually equivalent performance properties in Nylon 6,6. The ability to commercially produce a fully equivalent treated 70C product via a "continuous" treatment process using neat silane injection offers a tremendous production cost and logistics advantage over "batch" treatment processes using dilute silane solutions.

4.) A comparison of test compounds X and U (wherein both treated fillers were prepared via the Turbulizer treatment process) clearly illustrates the performance advantages provided by the 3:1 ratio aminosilane/octylsilane treatment blend over straight aminosilane treatment on 70C calcined clay. At equal treatment levels of 1.25%, Gardner drop weight impact was improved approximately 50% as compared to use of conventional aminosilane treatment.

EXAMPLE 4

In this experiment, a series of silane treated 70C products were produced via neat silane addition using the Turbulizer treatment process previously described in Example 3. Treated 70C clay products were produced using aminosilane and 3:1 ratio aminosilane/octylsilane blend, respectively, over a range of treatment levels of from 0.75% to 1.75%. As in previous examples, the aminosilane and octylsilane reagents employed were 3-Aminopropyltriethoxysilane and n-Octyltriethoxysilane. Product treatment levels were verified by Leco carbon combustion analysis.

The various treated 70C products were then compounded into Nylon 6,6 resin (Dupont's Zytel 101) at a 40% filler loading using the ZSK 30 mm twin screw extruder. Molded specimens were prepared and tested. The Gardner drop weight impact properties are plotted in the Figure as a function of the silane treatment level on 70C. Performance advantages in Gardner drop weight impact for the 3:1 ratio aminosilane/octylsilane treatment blend are seen across the entire treatment level range, but the impact improvement on 70C is by far the greatest at a treatment level of about 1.25%.

EXAMPLE 5

In this experiment, Huber 90C (a very fine particle size calcined clay) was surface treated with the 3:1 ratio aminosilane/octylsilane blend at a total silane treatment level of 1.50%. The 3:1 ratio silane blend was applied neat using the Turbulizer treatment process as previously described in Example 3. A higher silane treatment level was needed on 90C (versus the 1.25% on 70C) in order to maximize its drop weight impact properties in Nylon 6,6. However, the use of a higher silane treatment level is not totally unexpected given the greater BET surface area of 90C versus 70C (see Table I for a comparison of properties). Product treatment level was verified by Leco carbon combustion analysis.

For testing purposes, the treated 90C product was compounded into Nylon 6,6 resin (Dupont's Zytel 101) at a 40% filler loading. An untreated 90C was also included in this nylon test program to serve as a comparative control. The resulting test data are summarized in Table VI. As can be readily seen from the performance data of Table VI, the Izod impact, Gardner drop weight impact and elongation at break properties of 90C calcined clay can all be substantially improved through appropriate surface treatment with the 3:1 ratio aminosilane/octylsilane blend of this invention. These 90C performance enhancements can also be achieved with little to no loss in accompanying tensile and flexural properties. This example thereby demonstrates that the novel treatment technology described herein provides functionality to calcined clay fillers of extremely fine particle size (i.e., those having an average Stokes Equivalent Particle Diameter of less than 1.0 micron). In addition, it should be noted that the treated 90C product (Test Z of Table VI) offers a few performance advantages over that provided by the preferred treated 70C product of Example 3 (Test X of Table V). A comparison of test products X and Z indicates that the latter provides more than a 100% improvement in tensile modulus, while some modest improvements were also seen in Izod and Gardner drop weight impact properties. These performance improvements are for the most part believed attributable to the significantly finer particle size associated with test product Z.

The invention has been described herein with reference to certain preferred embodiments. However, as obvious variations thereon will become apparent to those skilled in the art, the invention is not to be considered as limited thereto.

TABLE VI

COMPARISON OF TREATED AND UNTREATED VERSIONS OF HUBER 90C CALCINED CLAY IN NYLON 6,6* APPLICATION

| Property | Test Compounds | |
| --- | --- | --- |
| | Y | Z |
| 90C Loading**, % | 40 | 40 |
| Clay Surface Treatments:*** | | |
| % Aminosilane | none | 1.125% |
| % Octylsilane | — | 0.375% |
| Tensile Modulus, psi (×10³) | 1,968.0 | 1,781.0 |
| Tensile Strength, psi (×10³) | 12.8 | 13.8 |
| Flexural Modulus, psi (×10³) | 853.2 | 837.8 |
| Flexural Strength, psi (×10³) | 20.4 | 22.1 |
| Elongation at Break, % | 1.1 | 4.9 |
| Notched Izod Impact, ft.-lbs. | 0.41 | 0.79 |
| Gardner Drop Weight Impact, in.-lbs. | 10 | 112 |

NOTE:
*Nylon 6,6 resin used was Dupont's Zytel 101.
**90C = "Huber 90C" very fine particle size, calcined kaolin clay (Average Stokes Equivalent Particle Diameter = 0.7 microns).
***For treated clay version, total silane addition level = 1.50% (@ 3:1 Aminosilane/Octylsilane wt. ratio). Silane addition level is based on weight of dry clay. Aminosilane = 3-Aminopropyltriethoxysilane; Octylsilane = n-Octyltriethoxysilane.

What is claimed is:

1. A polyamide resin composition, comprising a polyamide resin and a silane treated mineral product, said mineral product comprising a mineral nucleus selected from the group consisting of clay, talc, wollastonite, or glass, which has been surface treated with a blend of silanes comprising an aminosilane and an alkylsilane in a blending ratio of aminosilane to alkylsilane of about 1:1 to 5:1 by weight.

2. A polyamide resin composition according to claim 1, wherein the mineral nucleus is calcined kaolin clay.

3. A polyamide resin composition according to claim 1, wherein the mineral nucleus is calcined kaolin clay and is substantially uniformly coated with said blend of aminosilane and alkylsilane.

4. A polyamide resin composition, comprising a polyamide resin and a filler, said filler comprising a silane treated mineral product, said mineral product comprising a mineral nucleus which has been surface treated with a blend of silanes comprising an aminosilane and an alkylsilane having a blending ratio of aminosilane to alkylsilane of about 1.1 to 5:1 by weight.

5. A polyamide resin composition according to claim 4, wherein the combined treatment level of said blend of silanes ranges from about 0.5–2.0% by weight of dry mineral.

6. A polyamide resin composition according to claim 5, wherein the combined treatment level of said blend of silanes ranges from about 1.1–1.6% by weight of dry mineral.

7. A polyamide resin composition according to claim 1, wherein said resin is filled with about 5–50% by weight of said mineral product.

8. A polyamide resin composition according to claim 4, wherein said polyamide is a nylon selected from the group consisting of Nylon 6, Nylon 6,12 and Nylon 6,6.

9. A polyamide resin composition according to claim 4, wherein said polyamide contains said filler in an amount ranging from about 5–50% by weight.

10. A polyamide resin composition according to claim 4, wherein said resin composition exhibits improved tensile modulus, flexural modulus and flexural strength as compared to unfilled polyamide resins and yields improved Gardner drop weight impact characteristics without sacrificing tensile and flexural properties as compared to compositions containing an aminosilane treated mineral product at an equivalent filler loading.

11. A polyamide resin composition according to claim 4, wherein said aminosilane is of the following formula:

$$RHN-(CH_2)_a-SiR'_b(OR'')_{3-b}$$

wherein:
R=H or $H_2NCH_2CH_2-$
R'=$C_1$–$C_3$ alkyl group
R''=$C_1$–$C_3$ alkyl, aryl or acetyl group
a=a value of 1–6
b=a value of 0 or 1.

12. A polyamide resin composition according to claim 4, wherein said alkylsilane is of the following formula:

$$R^*-SiR'_b(OR'')_{3-b}$$

wherein:
R'=$C_1$–$C_3$ alkyl group
R''=$C_1$–$C_3$ alkyl, aryl or acetyl group
R*=$C_1$–$C_{20}$ alkyl group
b=a value of 0 or 1.

13. A polyamide resin composition according to claim 4, wherein said filler comprises a nucleus of calcined clay having a surface coating comprising the blend of silanes, wherein the treatment level of said blend of silanes ranges from about 0.5–2.0% by weight of dry calcined clay.

14. A polyamide resin composition according to claim 13, wherein said treatment level of said blend of silanes ranges from about 1.1–1.6% by weight of dry calcined clay.

15. A polyamide resin composition according to claim 13, wherein said alkylsilane is n-octyltrialkoxysilane or n-octadecyltrialkoxysilane and said aminosilane is 3-aminopropyltrialkoxysilane, N-2-aminoethyl-3-aminopropyltrialkoxysilane, or N-(2-aminoethyl)-3-aminopropylmethyldialkoxysilane.

16. A polyamide resin composition according to claim 15, wherein said alkoxy substituents on said silanes are methoxy or ethoxy.

17. A polyamide resin composition according to claim 1, wherein said polyamide is a nylon selected from the group consisting of Nylon 6, Nylon 6,12 and Nylon 6,6.

18. A method of improving impact properties of a polyamide resin composition comprising a polyamide resin and a filler, the method comprising the steps of:

a) providing a mineral product having a mineral nucleus;

b) blending an aminosilane and an alkylsilane to form a blend in a blending ratio of aminosilane to alkylsilane of about 1:1 to 5:1 by weight;

c) surface treating said mineral nucleus with the blend of aminosilane and alkylsilane to form a silane treated mineral product; and d) combining said surface treated mineral product and a polyamide resin to form said polyamide resin composition having improved impact properties without sacrificing tensile and flexural properties.

19. The method according to claim 18, wherein said polyamide is a nylon selected from the group consisting of Nylon 6, Nylon 6,12 and Nylon 6,6.

20. The method according to claim 18 wherein said alkylsilane is of the following formula:

$$R^*-SiR'_b(OR'')_{3-b}$$

wherein:
R'=$C_1$–$C_3$ alkyl group
R''=$C_1$–$C_3$ alkyl, aryl or acetyl group
R*=$C_1$–$C_{20}$ alkyl group
b=a value of 0 or 1.

21. The method according to claim 18 wherein said filler comprises a nucleus of calcined clay having a surface coating comprising the blend of silanes, wherein the treatment level of said blend of silanes ranges from about 0.5–2.0% by weight of dry calcined clay.

22. The method according to claim 21, wherein said treatment level of said blend of silanes ranges from about 1.1–1.6% by weight of dry calcined clay.

23. The method according to claim 21, wherein said alkylsilane is n-octyltrialkoxysilane or n-octadecyltrialkoxysilane and said aminosilane is 3-aminopropyltrialkoxysilane, N-2-aminoethyl-3-aminopropyltrialkoxysilane, or N-(2-aminoethyl)-3- aminopropylmethyldialkoxysilane.

24. The method according to claim 23, wherein said alkoxy substituents on said silanes are methoxy or ethoxy.

25. The method according to claim 18, wherein the polyamide resin contains an amount of the filler ranging from about 5–50% by weight.

26. The method according to claim 18, wherein said resin composition exhibits improved tensile modulus, flexural modulus and flexural strength as compared to unfilled polyamide resins and yields improved Gardner drop weight impact characteristics without sacrificing tensile and flexural properties as compared to compositions containing an aminosilane treated mineral product at an equivalent filler loading.

27. The method according to claim 18, wherein said aminosilane is of the following formula:

$$RHN-(CH_2)_a-SiR'_b(OR'')_{3-b}$$

wherein:
R=H or $H_2NCH_2CH_2-$
R'=$C_1$–$C_3$ alkyl group
R''=$C_1$–$C_3$ alkyl, aryl or acetyl group
a=a value of 1–6
b=a value of 0 or 1.

28. The method according to claim 18 wherein the mineral nucleus is selected from the group consisting of clay, talc, wollastonite and glass.

29. The method according to claim 28, wherein the mineral nucleus is calcined kaolin clay.

30. The method according to claim 29, wherein the mineral nucleus is calcined kaolin clay and is substantially uniformly coated with said blend of aminosilane and alkylsilane.

31. The method according to claim 18, wherein the combined treatment level of said blend of silanes ranges from about 0.5–2.0% by weight of dry mineral.

32. The method according to claim 31, wherein the combined treatment level of said blend of silanes ranges from about 1.1–1.6% by weight of dry mineral.

33. The method according to claim 28, wherein said resin is filled with about 5–50% by weight of said mineral product.

34. The method according to claim 18, wherein said surface treating further comprises mixing said blend with said mineral nucleus at an elevated temperature.

35. The method according to claim 34, wherein said elevated temperature ranges between about 60° and 100° C.

36. The method according to claim 18, wherein said blending steps forms a blend having an extended shelf-life.

* * * * *